USO10063044B2

(12) United States Patent
Sandell et al.

(10) Patent No.: US 10,063,044 B2
(45) Date of Patent: Aug. 28, 2018

(54) RIGID JOINT ASSEMBLY

(71) Applicant: NKT HV Cables GmbH, Baden (CH)

(72) Inventors: Håkan Sandell, Karlskrona (SE);
Andreas Tyrberg, Lyckeby (SE);
Armando León-Guarena, Malmö (SE);
Henrik Ekholm, Listerby (SE)

(73) Assignee: NKT HV Cables GmbH, Baden (CH)

( * ) Notice: Subject to any disclaimer, the term of this patent is extended or adjusted under 35 U.S.C. 154(b) by 0 days.

(21) Appl. No.: 15/574,726

(22) PCT Filed: May 26, 2016

(86) PCT No.: PCT/EP2016/061898
§ 371 (c)(1),
(2) Date: Nov. 16, 2017

(87) PCT Pub. No.: WO2016/193115
PCT Pub. Date: Dec. 8, 2016

(65) Prior Publication Data
US 2018/0138685 A1 May 17, 2018

(30) Foreign Application Priority Data
Jun. 2, 2015 (WO) .................. PCT/EP2015/062262

(51) Int. Cl.
*H02G 15/08* (2006.01)
*H02G 15/10* (2006.01)
(Continued)

(52) U.S. Cl.
CPC ............... *H02G 15/10* (2013.01); *H01B 7/14* (2013.01); *H02G 3/0481* (2013.01)

(58) Field of Classification Search
CPC ........ H02G 15/10; H02G 15/18; H02G 15/14; H02G 15/24; H02G 15/103; H02G 15/20; H02G 7/14; H02G 3/04; H02G 3/0481
(Continued)

(56) References Cited

U.S. PATENT DOCUMENTS 2,118,546 A * 5/1938 Beaver .................. H02G 15/24
174/21 R
2,142,884 A * 1/1939 Chaplin ................. H02G 15/24
174/106 R
(Continued)

FOREIGN PATENT DOCUMENTS

EP 0247791 A2 12/1987
EP 0744806 A1 11/1996
(Continued)

OTHER PUBLICATIONS

International Preliminary Report on Patentability Application No. PCT/EP2016/061898 Completed Date: May 15, 2017 7 pages.
(Continued)

*Primary Examiner* — Timothy Thompson
*Assistant Examiner* — Rhadames J. Alonzo Miller
(74) *Attorney, Agent, or Firm* — Whitmyer IP Group LLC

(57) ABSTRACT

A rigid joint assembly for jointing two cables; the assembly includes outer cable entry parts outside a water-tight casing assembly. A first and second cable insulation system deformation preventing devices are provided, each including a rigid pipe, which surrounds a respective first or second cable core end section, and a bedding material layer, which extends at least partially along a length of an inner surface of the respective rigid pipe. The assembly further includes first and second grooved pipes of elastic material having a plurality of grooves on the side facing the cable, each grooved pipe surrounding the respective first or second cable
(Continued)

core end section at a respective inner cable entry part inside the water-tight casing assembly 30.

19 Claims, 4 Drawing Sheets

(51) Int. Cl.
*H01B 7/14* (2006.01)
*H02G 3/04* (2006.01)

(58) Field of Classification Search
USPC ..................................................... 174/84 R
See application file for complete search history.

(56) References Cited

U.S. PATENT DOCUMENTS

| | | | | | |
|---|---|---|---|---|---|
| 2,169,570 | A * | 8/1939 | Ronci | ................. | H02G 15/013 123/169 TC |
| 2,287,163 | A * | 6/1942 | Bishop | ................. | H02G 15/14 156/49 |
| 2,908,744 | A * | 10/1959 | Bollmeier | ............ | H02G 15/113 174/76 |
| 4,024,718 | A * | 5/1977 | Roche | ..................... | E21B 7/128 114/258 |
| 4,032,214 | A * | 6/1977 | McNerney | ........... | H01R 13/523 29/870 |
| 4,518,632 | A * | 5/1985 | Jones | .................... | D01F 11/127 174/128.2 |
| 4,785,139 | A * | 11/1988 | Lynch | .................. | G02B 6/4465 138/121 |
| 5,125,061 | A * | 6/1992 | Marlier | ................ | G02B 6/4416 174/70 R |
| 5,125,062 | A * | 6/1992 | Marlier | ................ | G02B 6/4416 174/70 R |
| 5,278,358 | A * | 1/1994 | Blondin | ............... | G02B 6/3887 174/70 R |
| 5,286,921 | A * | 2/1994 | Fontaine | ................ | G01K 1/026 174/68.1 |
| 5,375,939 | A * | 12/1994 | Brown | ................. | H02G 15/007 24/122.3 |
| 5,520,422 | A * | 5/1996 | Friedrich | .................. | F16L 9/12 285/296.1 |
| 5,661,842 | A * | 8/1997 | Faust | ....................... | H01R 4/72 174/93 |
| 6,292,436 | B1 * | 9/2001 | Rau | ......................... | G01V 1/201 114/245 |
| 2002/0168231 | A1 * | 11/2002 | Hayakawa | ............... | H02G 1/10 405/158 |
| 2004/0097131 | A1 * | 5/2004 | Varreng | ............... | H01R 13/523 439/587 |
| 2004/0160663 | A1 * | 8/2004 | DeVincentis | ........ | G02B 6/4428 359/333 |
| 2004/0196529 | A1 * | 10/2004 | Young | .................. | G02B 6/4428 359/333 |
| 2005/0036751 | A1 * | 2/2005 | Young | .................. | G02B 6/4428 385/100 |
| 2005/0105164 | A1 * | 5/2005 | Young | .................. | G02B 6/4428 359/333 |
| 2005/0179988 | A1 * | 8/2005 | Young | .................. | G02B 6/4428 359/333 |
| 2005/0185257 | A1 * | 8/2005 | Young | .................. | G02B 6/4428 359/333 |
| 2005/0191910 | A1 * | 9/2005 | Bertini | ................ | H01R 13/523 439/676 |
| 2005/0200943 | A1 * | 9/2005 | DeVincentis | ........ | G02B 6/4427 359/333 |
| 2005/0201709 | A1 * | 9/2005 | DeVincentis | ........ | G02B 6/4428 385/135 |
| 2005/0217882 | A1 * | 10/2005 | Rizzuto, Jr. | ............. | F16L 25/10 174/480 |
| 2007/0053645 | A1 * | 3/2007 | Kordahi | ............... | G02B 6/4428 385/135 |
| 2007/0269169 | A1 * | 11/2007 | Stix | ....................... | G02B 6/3816 385/100 |
| 2007/0289779 | A1 * | 12/2007 | Howard | ................ | E21B 17/028 175/40 |
| 2009/0272561 | A1 * | 11/2009 | Norde | .................. | H02G 15/115 174/135 |
| 2011/0107834 | A1 * | 5/2011 | Howard | ................ | E21B 17/028 73/431 |
| 2011/0188803 | A1 * | 8/2011 | Kordahi | ............... | G02B 6/4428 385/24 |
| 2013/0170519 | A1 * | 7/2013 | Alliot | ................... | F16L 13/0272 374/161 |
| 2014/0166335 | A1 * | 6/2014 | Kagoura | ................ | H01B 7/045 174/107 |
| 2014/0270674 | A1 * | 9/2014 | Cairns | .................. | G02B 6/4441 385/135 |
| 2015/0234143 | A1 * | 8/2015 | Smith | .................. | G02B 6/4494 702/2 |
| 2016/0054535 | A1 * | 2/2016 | Toth | ..................... | G02B 6/4428 385/135 |

FOREIGN PATENT DOCUMENTS

| | | |
|---|---|---|
| GB | 614427 A | 12/1948 |
| JP | 56149011 A | 11/1981 |
| WO | 9611521 A1 | 4/1996 |

OTHER PUBLICATIONS

International Search Report & Written Opinion of the International Searching Authority Application No. PCT/EP2016/061898 Completed Date: Sep. 2, 2016; dated Sep. 12, 2016 12 pages.

* cited by examiner

RIGID JOINT ASSEMBLY

TECHNICAL FIELD

The disclosure relates to a rigid joint assembly for electric cables, and primarily medium or high voltage submarine cables.

BACKGROUND

High voltage (HV) and medium voltage (MV) cables are used for power distribution on land and in the sea. Such cables often uses an extruded insulation system and comprise an electric conductor that is surrounded by an insulation system and a number of layers of different materials having different purposes and uses, e.g. as many as eight to nine layers. The insulation system comprises an inner semi-conducting layer closest to the conductor, an insulation layer externally of the conductor screen and an outer semi-conducting layer.

It is common to use the term cable core, and generally the cable core comprises the main layers of an inner electric conductor, and the insulation system as described above and comprising at least an inner semi-conducting layer, an insulation layer and an outer semi-conducting layer.

A pre-fabricated joint can be used when jointing two lengths of cable. The pre-fabricated joint comprises a pre-moulded/pre-fabricated joint body of e.g. rubber that is used to restore the insulation system when jointing the two lengths of cable. The conductors of the cable cores are jointed and the insulation systems of the jointed cable cores are restored in the joint body. This type of joint is commonly used for jointing high voltage cables with an extruded insulation system, normally comprising cross linked polyethylene (XLPE). For submarine cables, the pre-fabricated joint body is mounted in air at atmospheric pressure and then placed inside a water tight metal casing. The metal sheath of the cable core is normally connected to the casing through soldering, thereby achieving an overall watertight design for the joint.

For submarine DC cables containing one cable core, a rigid joint consists of one of these metallic casings containing a cable core joint, which casing normally is placed in an outer container that is also used to connect the armour layers of the cable. For submarine AC cables containing three cable cores, a rigid joint consists of three of these metallic casings, each containing a core joint. The casings are normally placed in an outer container which is also used to connect the armour layers of the cable. The entire joint including the outer container is commonly referred to as a rigid joint.

When such a rigid joint is used for jointing of submarine cables, the outer container that surrounds the water tight metal casing/casings has a mechanical function of protecting the casings and it will usually be filled with water, when the cable and the rigid joint is submersed into the water. Thus, the inner water tight casing functions as a pressure vessel with an atmospheric pressure inside, and hydrostatic pressure of the water outside the casing. This results in a pressure gradient along the electrical core that is being jointed. The above described type of rigid joint with pre-fabricated rubber joint body has successfully been implemented for submarine cables at water depth up to approximately 600 m, corresponding to a hydrostatic pressure of approximately 6 MPa.

However, the question arises if such rigid joints could be used for large water depths, deeper than 600 m.

It has been found that for large water depths the scenario does not look well if a regular rigid joint is used. According to numerical analysis and experiments, an excessive deformation is expected over the extruded insulation in a critical transition region just outside the inner casing, where the cable core is entering into the inner casing. A significant reduction in the outer diameter of the cable core insulation occurs, so called necking, which is due to plastic deformation, yielding and/or creep of the cable insulation. Such deformations can significantly affect the optimal electrical characteristics of the extruded insulation, e.g. create undesirable consequences for the electrical field distribution over the cable and therefore cause its failure under operation.

The critical transition region, where the cable core is close to entering the inner casing of the joint, is severely affected by a significant pressure difference or gradient. Outside the casing, the cable core is exposed to a high hydrostatic pressure due to the large water depth, while inside the casing the cable core is under atmospheric pressure. During operation, the insulation system will be heated which reduces the mechanical strength of the extruded insulation, making the insulation even more susceptible to deformation.

Also, over this critical transition region, the high pressure difference creates a significant unbalanced compressive stress state on the cable along its axial direction. Thus, at the same time as the excessive necking occurs, there is a tendency for the extruded insulation to be displaced along the axial direction of the cable core towards the interior of the casing, where the pressure is lower. In addition to negatively affecting the electrical properties, this could also affect the water tightness of the casing at the location where the core enters the casing.

SUMMARY OF THE INVENTION

An object of the present invention is to provide an improved rigid joint assembly that is suitable to use for submarine cables at large water depth.

According to the present invention is defined a rigid joint assembly comprising a first cable core end section of a first electric cable, and a second cable core end section of a second electric cable, said respective first and second cable core end section comprising an electrical cable core comprising at least an inner electric conductor, and an insulation system comprising at least an inner semi-conducting layer, an insulation layer and an outer semi-conducting layer, said rigid joint assembly further comprising a joint connection inside of which the electrical cable core of the first cable core end section of the first electric cable is jointed with the electrical cable core of the second cable core end section of the second electric cable, the rigid joint assembly further comprising a water tight metal casing assembly surrounding the joint connection, which casing assembly comprises a casing body and inner cable entry parts at opposite ends of the casing assembly. The rigid joint assembly further comprises:

first and second outer cable entry parts located at opposite ends of the casing assembly outside the casing assembly, each outer cable entry part comprising an opening for receiving the respective cable core end section of the first cable and second cable, first and second cable insulation system deformation preventing devices each comprising a rigid pipe, which surrounds the respective first or second cable core end section at the respective outer cable entry part, and a bedding material layer, which extends at least partially along a length of an inner surface of the respective rigid pipe, and first and second grooved pipes of elastic material comprising a plurality of grooves on the side facing the cable, each grooved pipe surrounding the respective first or second cable core end section at the respective inner cable entry part.

By providing the first cable insulation system deformation preventing device comprising the rigid pipe that surrounds the cable core end section of the respective cable at the outer cable entry part outside of the water tight casing assembly and by providing the grooved pipe surrounding the respective first or second cable core end section at the respective inner cable entry part, i.e. inside the water tight casing assembly, is obtained the advantage that the rigid joint assembly can be used for jointing of extruded submarine cables at large water depths. This is possible since the cable core end section in the vicinity of the outer cable entry part, which cable core end section is subjected to the pressure difference between the gas pressure inside the casing assembly and a hydrostatic pressure externally of the casing assembly and comprises the critical transition region, will be protected by the rigid pipe. Furthermore, a synergistic effect is provided since the grooved pipe inside the casing assembly holds the cable core end section in place due to friction and is able to absorb movements of the cable for example during thermal expansion of the cable core end section when the cable is operated. Consequently, the insulation system of the cable at the cable core end section will be protected from deformation such as necking, and the rigid pipe will together with the grooved pipe also act to prevent that the insulation is displaced in the axial direction, from the side with hydrostatic pressure into the casing assembly with lower pressure, where the grooved pipe surrounds the cable core end section. This effect is obtained since the rigid pipe will act to contain the cable core end section with the insulation system inside the pipe and the grooved pipe will hold the cable even in case of relatively large movements without losing the grip of the cable. The bedding layer assures sufficient friction between the rigid pipe and the cable core end section.

According to one feature, each bedding material layer comprises elastic synthetic polymeric material. Also, preferably each bedding material layer has a thickness of from 1-10 mm. The thickness is measured in radial direction. The material and the specific thickness will help to prevent that the insulation system is deformed and/or displaced at the outer cable entry part which is located outside of the casing assembly.

According to another feature, the elastic material of each of the grooved pipes comprises elastic synthetic polymeric material. The synthetic elastic polymeric materials can be adapted to the surrounding conditions and are robust and durable.

According to a further feature, the material of the bedding material layers and the elastic material of the grooved pipe are the same. In this way the materials will be compatible and the predictability of the rigid joint assembly will be improved.

According to yet another feature, each of the bedding material layers extends up to about 80% of the total length of the respective rigid pipe and is positioned such that it extends to the end of the respective rigid pipe that is closest to the casing assembly. This facilitates joining by soldering the outer end of the rigid pipe to other layers of the cable or to the rigid joint assembly without the risk for the bedding material to be damaged. Also, it is beneficial to have a rigid outer edge of the rigid pipe which is in contact with or closest to a lead sheath of the cable, since in this way there is no risk that the bedding material will swell outside the rigid pipe and/or that the lead sheath will flow or penetrate inside the rigid pipe.

According to one feature, at least one of the grooved pipes is surrounded radially outwards by a rigid casing. Preferably, both grooved pipes are surrounded radially outwards by a rigid casing. This will protect the grooved pipe and prevent axial or radial movements of the pipe.

According to a feature, each of the grooved pipes is arranged at a distance from the respective rigid pipe in the axial direction of the cable. In this way it will be easy to replace the rigid pipe or the grooved pipe is desired.

According to a further feature, the bedding material layer and the respective grooved pipe are at least partly arranged in contact with each other. In this way it is possible to minimize the sliding of the bedding material and the grooved pipe in axial direction.

According to another variant, the bedding material layer and the grooved pipe in the respective side of the casing assembly are integrated. In this way there will be no gap between the first cable insulation system deformation preventing member and the grooved pipe, whereby mutual sliding in axial direction can be prevented. Also it can be assured that the bedding material and the material for the grooved pipe are compatible.

According to yet another variant, an end portion of the grooved pipe faced towards an end surface of the rigid pipe in the respective side of the casing assembly is tapered. In this way the grooved pipe can conform to the shape and size of the end surface of the rigid pipe and the bedding material thereof and smooth transition between the components will be achieved.

According to a further feature, the grooved pipe is arranged at a distance in radial direction from the inner surface of the inner cable entry part. Thus a hollow interior is formed inside the casing assembly. This way it will be possible, for example, to control and/or maintain a controlled pressure inside the casing.

According to yet another feature, the rigid pipe comprises a circumferential recess adapted to contain the bedding material layer. Thereby, the rigid pipe can be configured to fit snugly over the respective cable core end section.

According to a further feature, the external surface of the cable core end section is the outer semi-conducting layer of the insulation system of the cable core of the respective cable core end section. In this way, the movements of the insulation system will be effectively prevented.

According to another variant the rigid joint assembly is surrounded by a protective sheath that extends along the whole length of the rigid joint assembly. In this way the components of the rigid joint assembly may be protected.

According to a further variant of the invention, the respective inner cable entry part is a separate part connectable to the casing body. In this way the mounting of the casing assembly may be facilitated.

The rigid pipe may be located totally outside of the inner cable entry part of the casing assembly. However, it is preferable that the rigid pipe is located such that there is no part of the cable core that is directly exposed to external pressure between the rigid pipe and the inner cable entry part, i.e. the cable entry part that is part of the water tight casing assembly.

The joint connection mentioned is primarily, but not limited to, the type of pre-fabricated joint known in prior art as described above in the background and comprising a pre-moulded/pre-fabricated joint rubber body that is used to joint two lengths of cable. The type of cable is primarily, but not limited to, a submarine cable having a cable core comprising an inner conductor and an extruded insulation system as described above. The cable may comprise further layers such as a metal sheath, further bedding layers, outer protective layer of e.g. polymer. The cable may also comprise a tensile armour layer, of e.g. metal wires, or other load carrying members. When laid down in water, one or more rigid joint assemblies according to the invention would usually be placed in an outer container which may also be used to connect the armour layers of the cables, as previously described.

Further features and advantages of the invention will also become apparent from the following detailed description of embodiments.

BRIEF DESCRIPTION OF THE DRAWINGS

The invention will now be described in more detail, with reference being made to the enclosed schematic drawings illustrating different aspects and embodiments of the invention, given as examples only, and in which.

Elements that are the same or represent corresponding or equivalent elements have been given the same reference numbers in the different figures.

DETAILED DESCRIPTION

Figure 1:
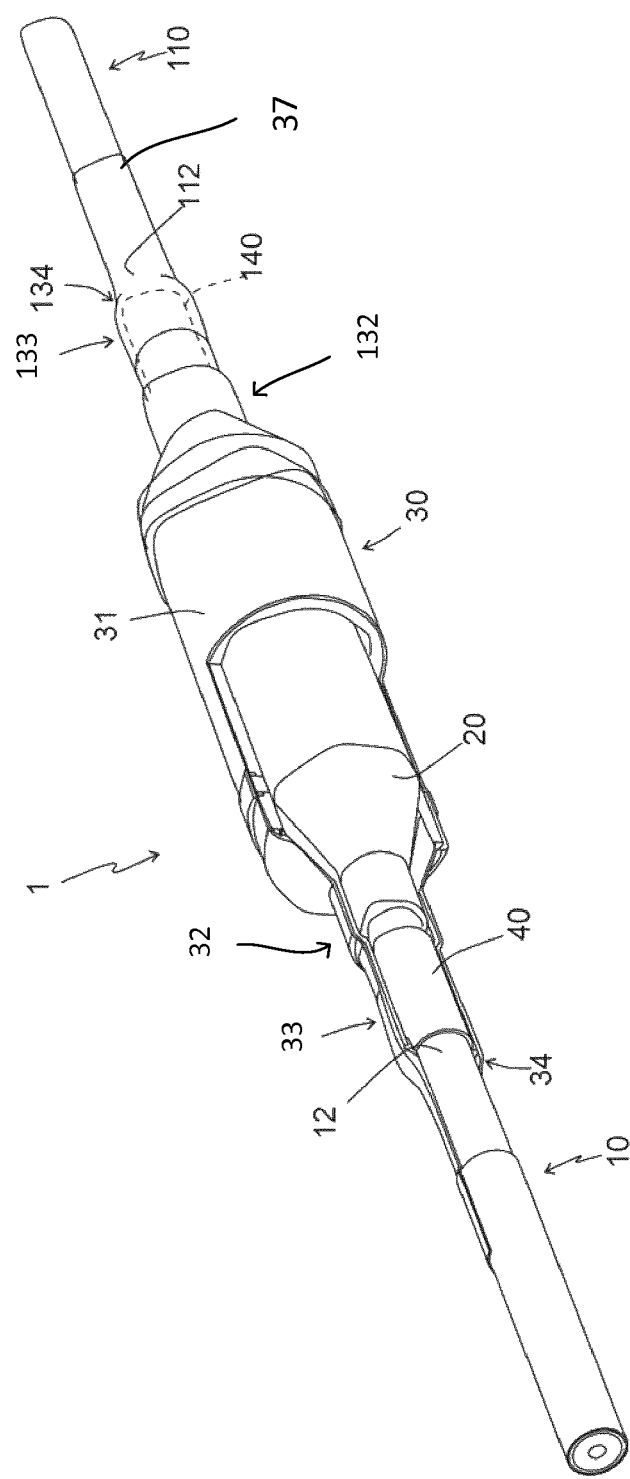
FIG. 1 illustrates schematically an example of a rigid joint assembly according to an embodiment of the present invention in a perspective view.

In FIG. 1 is illustrated an example of a rigid joint assembly 1 comprising a joint connection 20 inside of which the core end of a first electric cable 10 and the core end of a second electric cable 110 are connected. The cables are medium or high voltage cables suitable for submarine installation. The cables are preferably direct current, DC, cables. The joint connection is e.g. a pre-fabricated joint of the type described above, comprising a pre-moulded/pre-fabricated rubber joint body that is used to restore the insulation system where the two core ends are jointed. The rigid joint assembly 1 further comprises first and second outer cable entry parts 33 and 133 comprising a respective opening 34, 134 for the respective cable, a casing assembly 30 inside of which the joint connection 20 is provided and which casing assembly 30 comprises a casing body 31 and first and second inner cable entry parts 32, 133. The first outer cable entry part 33 comprises a first insulation system deformation preventing device 40 and the second outer cable entry part 133 comprises a second insulation system deformation preventing device 140. The rigid joint assembly 1 is surrounded by a protective sheath 37 that extends along the whole length of the rigid joint assembly 1.

Figure 2A:
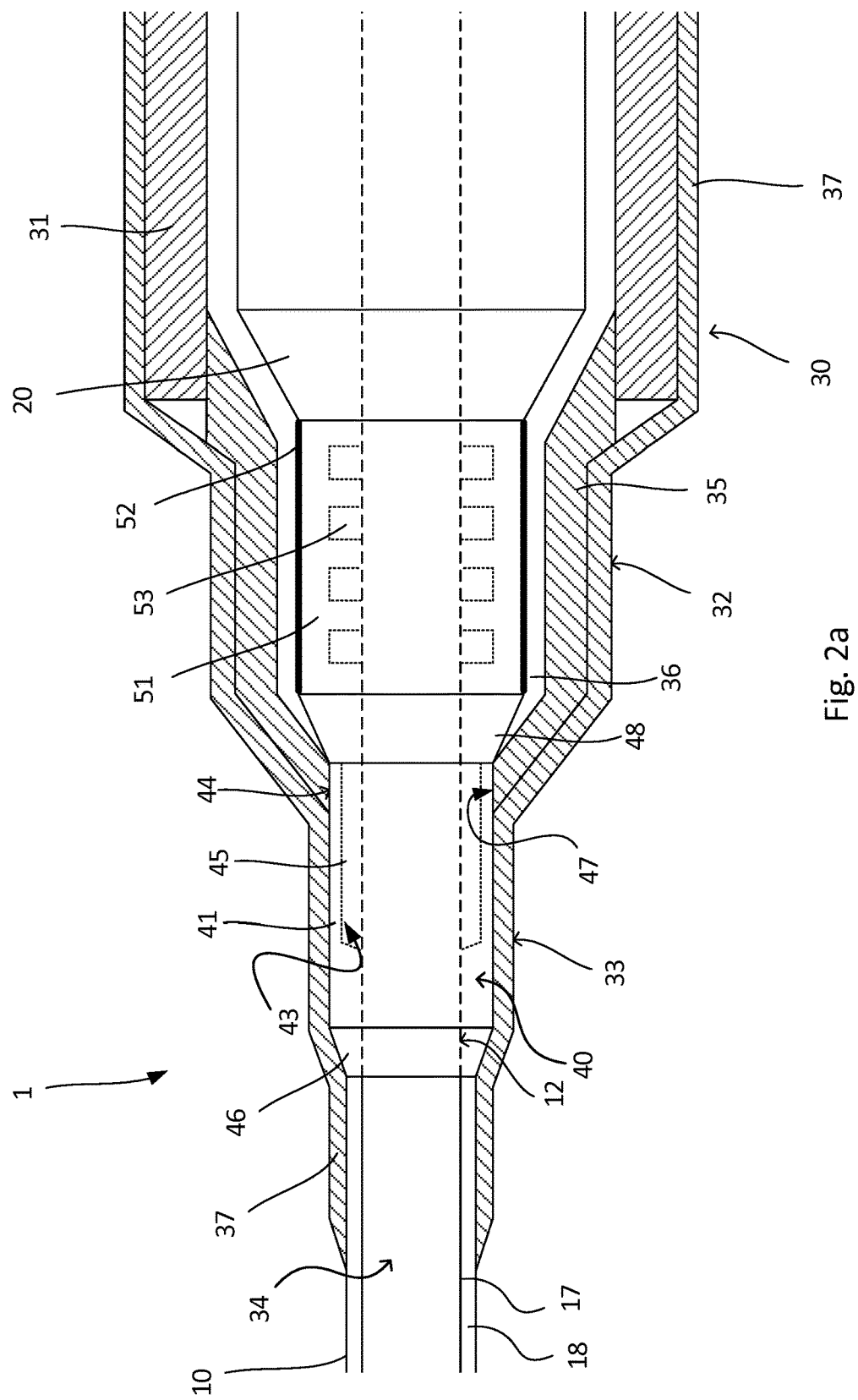
FIGS. 2a and 2b illustrate schematically mirror imaged portions of another embodiment of a rigid joint assembly in cross section.
Figure 2B:
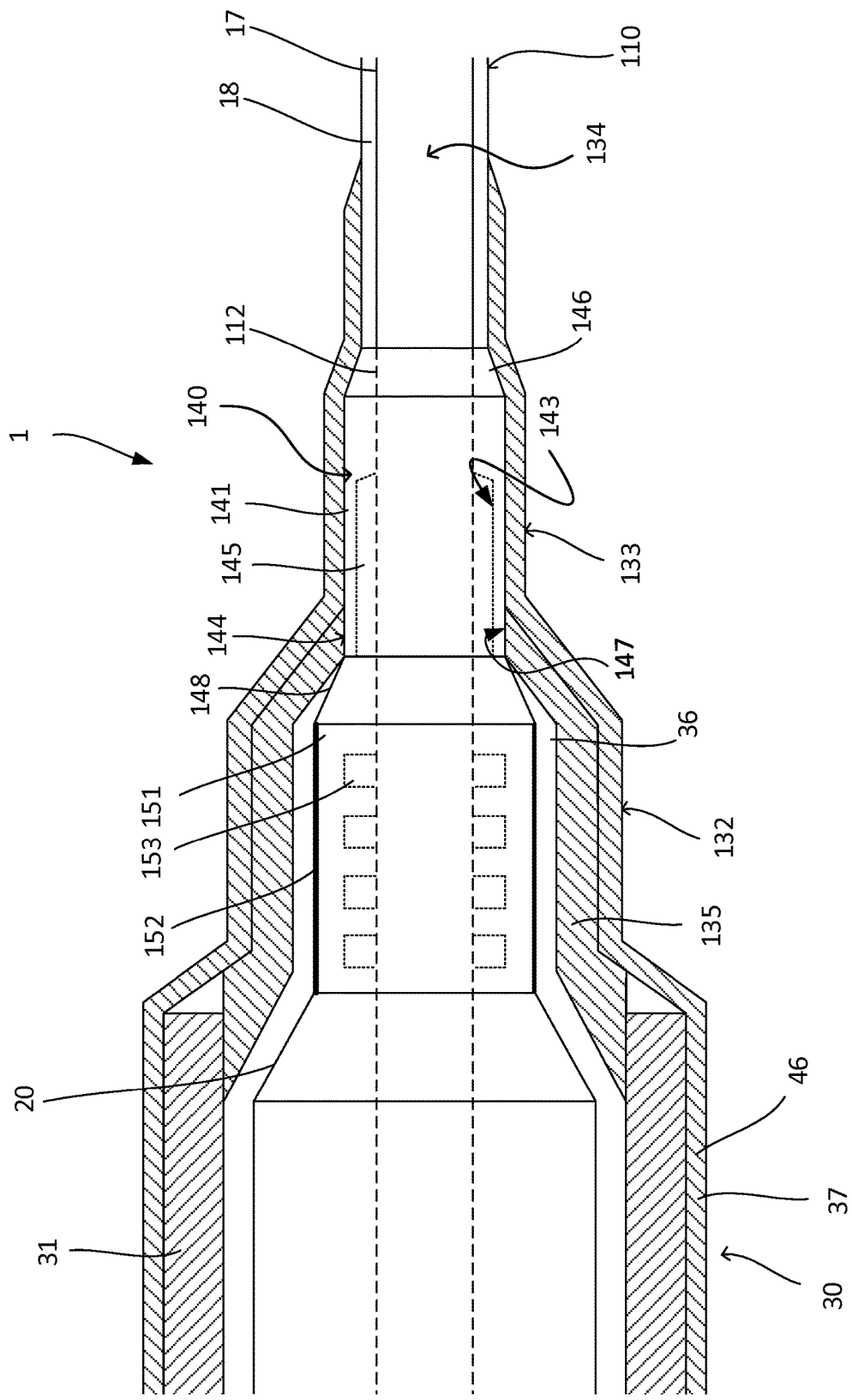

In FIGS. 2a and 2b is shown in more detail another example of a rigid joint assembly 1. The rigid joint assembly 1 comprises a casing assembly 30 which comprises a substantially cylindrical casing body 31 and a wall section piece 35 for a first inner cable entry part 32 and a wall section piece 135 for a second inner cable entry part 132. The wall section pieces 35 and 135 for the first and second inner cable entry parts 32, 132, respectively, are separate parts of the water tight casing assembly 30. The wall section pieces 35 and 135 are connected to the casing body 31 for example by means of welding. In FIGS. 2a and 2b, the wall section pieces 35 and 135 constitute the first and second inner cable entry parts 32, 132. The wall section pieces 35, 135 could alternatively be integrated with the casing body or constitute one piece with the casing body 31. The protective sheath 37 surrounds the water-tight casing assembly and extends along the whole length of the rigid joint assembly 1. The protective sheath 37 may be for example a lead sheath.

Reference is now made to FIGS. 2a and 2b. The rigid joint assembly 1 further comprises a first outer cable entry part 33 which has an opening 34 through which a cable core end section 12 of the first cable 10 enters into the casing assembly 30. This cable core end section 12 of the first cable will be referred to as the first cable core end section. The casing assembly 30 further comprises, at the end opposite the first inner cable entry part 32, a second inner cable entry part 132 comprised in the casing assembly 30. The rigid joint assembly 1 further comprises a second outer cable entry part 133 which has an opening 134 through which a cable core end section 112 of the second cable 110 enters into the casing assembly. This cable core end section 112 of the second cable will be referred to as the second cable core end section. The joint connection 20 is located in a hollow interior 36 (See FIGS. 2a and 2b) of a water tight metal casing assembly 30. The cables 10 and 110 comprise an insulation system with an outermost semi-conducting layer 17 which is surrounded by an outer sheath 18 of for example lead. Inside the rigid pipe 41, 141, the outer sheath 18 is taken off and the rigid pipe 41, 141 with a bedding material layer 45, 145 is arranged to be in direct contact with the outer semi-conducting layer 17 of the cable 10, 110. The rigid pipe 41, 141 may comprise a respective tapered outer end 46, 146 to better adapt to the shape of the cable 10 entering the first and second outer cable entry parts 33, 133 via the respective opening 34, 134.

It should be understood that the casing assembly 30 as such may comprise several components that originally are separate parts that are mounted together and connected, e.g. by welding or other device. For instance, in the examples shown in FIGS. 2a and 2b, wall section pieces 35 and 135 are separate components mounted together with a substantially cylindrical casing body 31. For example, in order to be able to mount the casing assembly over the joint connection, the casing assembly would be divided in at least two casing assembly halves, such as a lower half and an upper half, that are assembled in order to obtain the casing assembly, usually welded together. Also, for example the inner cable entry parts may be components of the casing assembly that originally are separate parts to facilitate mounting of the casing. When referring to the casing assembly, it should be understood that the word casing assembly means the entire casing assembly and includes all parts of the casing assembly, irrespective of if they are integrated parts or components that have been assembled in order to form the casing assembly, unless otherwise explicitly stated.

When installing the cables with the shown rigid joint assembly, one (if direct current, DC, cable) or three (if alternating current, AC, cables) of these rigid joint assemblies are placed in an outer container (not shown) which is also used to connect the armour layers (not shown). The outer container is filled with water that will consequently surround the casing assembly. However, inside the casing assembly there is still the same air pressure as when the casing assembly was installed around the joint connection on the installation or repair site, e.g. a vessel.

Figure 3A:
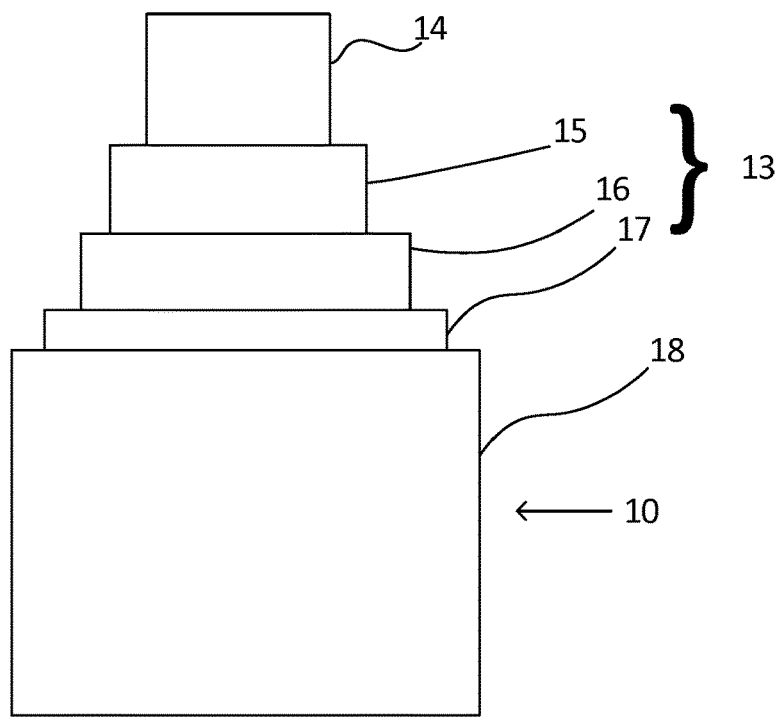
FIGS. 3a and 3b illustrate schematically a partially cut side view and a cross section of a cable core.
Figure 3B:
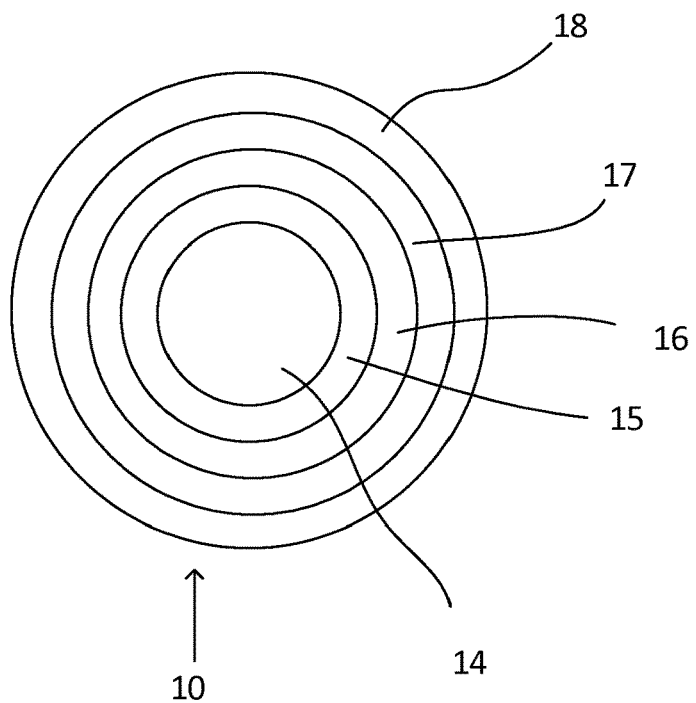

The concerned type of high voltage cable of extruded, e.g. XLPE (cross-linked polyethylene polymer) type usually comprises many layers, but only the main layers of the cable 10 are shown in FIG. 3a in a partly cut side view and in FIG. 3b in a radial cross section. By cable core is meant a cable body comprising a conductor and an insulation system, which in turn may comprise several layers. In example of FIGS. 3a and 3b the cable core or cable body comprises an electric conductor 14 surrounded by an insulation system comprising an inner semi-conducting layer 15, an insulation layer 16 of e.g. XLPE, and an outer semi-conducting layer 17. These layers constitute main cable core layers. Externally of the insulation system 13 of the cable core an outer metal sheath 18, e.g. a lead sheath, can be provided. The cable core may sometimes also comprise other internal layers, e.g. fillers or beddings.

The cable usually comprises other layers externally of the cable core, including outer sheaths that may be metal and/or extruded, protective sheaths and/or tensile armour layer(s). However, these external layers are removed at the cable core end section (referred to as 12 and 112 in FIGS. 1, 2a and 2b) of the cable when preparing the cable for the joint. In the illustrated examples, the cable core end sections 12 and 112 of the cable comprise only the mentioned main cable core layers.

In the interior 36 of the casing assembly there is gas, normally air at atmospheric pressure. However, the cable 10 outside of the casing assembly is subjected to the hydrostatic pressure from the surrounding water. The pressure caused by the surrounding water is much higher than the pressure inside the casing assembly. This results in a pressure gradient that will affect the cable core end section of the insulation in a pressure transition region in the vicinity of where the cable core enters the casing assembly. This transition region can extend outside the cable core end section which enters into the casing assembly via the inner entry part and it can also extend for some length inside the inner cable entry part of the casing assembly.

In order to prevent deformation of the cable core, and in particular deformation of the cable core insulation system 13, caused by the pressure gradient, a first cable insulation system deformation preventing device 40 comprising a rigid pipe 41 and a bedding material layer 45, which extends at least partly along a length of an inner surface of the rigid pipe, is arranged to surround the cable core end section 12 of the cable 10 at or in the first outer cable entry part 33. In the illustrated example of FIGS. 2a and 2b, the inner surface of the rigid pipe 41 comprises a circumferential recess 43 adapted to contain the bedding material layer 45. The outer cable entry part 33 is located outside the water tight casing assembly 30 in axial direction of the cable, see FIGS. 1 and 2a. A corresponding second cable insulation system deformation preventing device 140 comprising a rigid pipe 141 and a bedding material layer 145 is shown in FIG. 2b, which bedding material layer 145 extends at least partly along a length of an inner surface of the rigid pipe 141, is arranged to surround the second cable core end section 112 of the second cable 110 at or in the second outer cable entry part 133 in a similar manner as the first cable insulation system deformation preventing device 40 in FIG. 2a. In the illustrated example, the inner surface of the rigid pipe 141 comprises a circumferential recess 143 adapted to contain the bedding material layer 145 and the device 140 is arranged to surround the cable core end section 112 of the second cable 110.

To ensure that deformation of the cable core is prevented effectively, the rigid joint assembly 1 of the present invention further comprises a grooved pipe 51 of elastic material comprising a plurality of grooves 53 on the side facing the cable core, as shown in FIG. 2a and in a mirror-imaged way in the opposite end of the casing assembly 30 as illustrated in FIG. 2b. The grooved pipe 51 surrounds the first cable core end section 12 at the inner cable entry part 32 inside the casing assembly 30. By the inner cable entry part is thus meant an entry part which is a part of the water tight casing assembly 30 and which thus accommodates the grooved pipe inside the casing assembly. A corresponding grooved pipe of elastic material 151 comprising a plurality of grooves 153 on the side facing the cable core is arranged to surround the second cable core end section 112 at the second inner cable entry part 132 inside the casing assembly 30 as shown in FIG. 2b. The grooved pipe of elastic material 51; 151 is preferably arranged at a distance in radial direction from an inner surface of the inner cable entry part 32; 132 of the casing assembly 30, whereby a hollow interior 36 is formed inside the casing assembly 30. In this way the pressure inside the casing assembly between the grooved pipe and the cable core can be controlled and kept low, and always under 2 Mpa, also during the operation of the cable when there are temperature variations.

The purpose of the grooved pipe of elastic material is to absorb movements caused by thermal expansion during the operation of the cable. The grooved pipe thus prevents that the thermal expansion both axially and radially becomes irreversible. Therefore surge of the insulation material is prevented. The grooved pipe holds the cable while it allows relatively large movements without losing the grip of the cable core. The grooves may have any cross-sectional shape and the grooves may be positioned in axial or circumferential direction or they may be helically formed along the periphery of the pipe. Due to the elasticity of the material the friction between the cable core surface and the elastic material is sufficient to prevent sliding of the cable relative to the grooved pipe. Suitable materials for the grooved pipe are for example different synthetic rubber materials such as EPDM (Ethylene-Propylene-Diene-Monomer) rubber. Suitably, the rubber materials have a hardness of from Shore A 40 to 99, and preferably Shore A 50 to 80, and most preferably Shore A from 55 to 70. Materials having such hardness will be able to for example prevent the axial movement of the insulation layers in the insulation system of the cable core during normal operation of the cable and support and hold the cable until the axial force is larger than the frictional force between the cable core surface and the grooved pipe, which may happen in case of breakage of the cable or the rigid joint assembly, but not during the normal operation of the cable. The radial extension of the grooved pipe is preferably larger than the radial extension of the bedding material layer. The length of the grooved pipe may be the same as the length of the rigid pipe, but it may be shorter or longer, depending on the circumstances. Thus, the length of at least 40 mm is generally preferable, and more preferably at least 100 mm, or even at least 200 mm.

The grooved pipe of elastic material 51 is preferably surrounded radially outwards by a rigid casing 52 as shown in FIG. 2a and the grooved pipe 151 is surrounded by a rigid casing 152 as shown in FIG. 2b. The rigid casing further assists in keeping the grooved pipe in place. The rigid casing may have a wall thickness from 2 to 5 mm, preferably about 3 mm.

From FIG. 1, FIG. 2a and FIG. 2b it can be seen that the rigid pipe 41, 141 of the first cable insulation system deformation preventing device 40, 140 surrounds the cable core end section 12, 112 of the cable 10, 110 at the respective first and second outer cable entry part 33, 133. In FIG. 1 the rigid pipes 41, 141 surround the respective cable core end section 12, 112 and fit snugly over the respective cable core. The bedding material layer 45, 145 which is shown in FIGS. 2*a* and 2*b* with an enlarged thickness, extends at least partly along a length of an inner surface of the rigid pipe. In the embodiment shown in FIG. 1 the rigid pipes 41, 141 of the first and second cable insulation system deformation preventing device 40, 141 are positioned at a distance from the inner cable entry parts 32, 132. The inner cable entry parts 32, 132 comprise grooved pipes. In the embodiment shown in FIGS. 2*a* and 2*b* the rigid pipes 41, 141 are positioned in contact with respective outer end portions 48, 148 of the grooved pipes 51, 151. The outer end portions 48, 148 may be inclined or tapered to have a shape of a truncated cone to better adapt to the shape of the respective rigid pipe 41, 141.

By rigid pipe is meant a pipe that does not substantially bend in axial direction of the pipe. The pipe is thus physically substantially inflexible or stiff. The rigid pipe is arranged concentrically with and radially outwards of the cable core end section of the cable. The rigid pipe should fit snugly over the cable core.

To ensure that the first cable insulation system deformation preventing device can prevent that the cable insulation, i.e. insulation system, is displaced and redistributed axially along the cable core due to the pressure differences, the bedding material layer is arranged between the cable core surface and the rigid pipe at least partly along a length of an inner surface of the rigid pipe. The bedding material layer can extend up to 100% of the total length of the rigid pipe 41, 141 but can be up to about 80%, suitably up to about 60%, and preferably up to about 40% of the total length of the rigid pipe 41, 141 and is positioned such that it extends to the end of the rigid pipe 41, 141 that is closest to the casing assembly 30.

If there is a high pressure on the cable core in one area, this may lead to deformation in that area by necking if the insulation material is allowed to be displaced from the necking area, along the axis of the cable, to another area with lower pressure where it can expand and a bulging of the insulation will occur instead. By having a tight fit of the rigid pipe over the bedding material and the cable core, such deformation by displacement of the insulation material will be prevented, since there will not be any empty space inside the pipe that allows for any bulging of the insulation material. Further the bedding material creates high friction and prevents axial movements of the cable that are caused by the pressure gradient. Thus, by creating a contact pressure between the rigid pipe, the bedding material and the insulation, the resulting friction force will prevent axial displacement of the insulation system in relation to the rigid pipe.

Suitable materials for the bedding material layer are elastic polymeric materials, such as synthetic rubber materials, e.g. EPDM rubber, which are soft enough to not cause plastic deformations in the insulation system of the cable core when it expands thermally. The hardness may be for example Shore A from 50 to 80, preferably Shore A from 60 to 70, and the thermal expansion coefficient may be for example about 210 e-6/K, but is not limited to the specific value. Each bedding material layer may have a thickness of from 1-10 mm, as measured in the radial direction of the cable core.

According to one variant of the invention, the bedding material layer and the grooved pipe of elastic material may be of the same material. Also, it is possible that the bedding material layer and the grooved pipe of elastic material are at least partly arranged in contact with each other. The bedding material and the grooved pipe of elastic material may also be integrated. If the materials are the same and the bedding material layer and the grooved pipe are integrated, the predictability of the material behavior will improve. Also, there will be no gap between the first and second cable insulation system deformation preventing device and the respective grooved pipes, whereby the insulation system will be effectively protected at the cable core end sections. An end portion of the grooved pipe of elastic material faced towards an end surface of the rigid pipe can be tapered to conform to the shape and size of the end surface of the rigid pipe and the bedding material thereof. This is important especially if the bedding material and the grooved pipe are connected or integrated so that smooth transition from the bedding material of the first insulation system deformation preventing device to the grooved pipe can be provided. However, in some embodiments, it may be preferable to position the first cable insulation system deformation preventing device and the grooved pipe at a distance from each other, as for example illustrated in the embodiment of FIG. 1. In this way it will be easy to replace components in the first cable insulation system deformation preventing device or the grooved pipe, if necessary for any reason or for example in case of damage.

The rigid pipe 41, 141 can comprise a circumferential recess 43, 143 adapted to contain the bedding material layer 45, 145. Alternatively, for example in case the bedding material layer has a length corresponding to the length of the rigid pipe, the rigid pipe may have a smooth interior surface that can fit snugly over the respective bedding material layer and the cable core end section of the cable and be in constant contact with the external surface of the bedding material. In case the rigid pipe has a circumferential recess, the wall thickness will vary between 2-20 mm for the thickest part of the pipe outside the circumferential recess and from 1-10 mm for the wall portion with the recess. The pipe may also have a uniform wall thickness and in that case the inner volume formed by an inner wall surface of the rigid pipe has a substantially circular cylindrical shape. The uniform wall thickness of the wall can be from 2-20 mm, and is preferably from 3 to 10 mm. The wall thickness can be adjusted depending on e.g. the diameter of the cable and the depth into which the cable is to be buried, and thus the pressure the cable will be subjected to. The free edge in the outer end of the rigid pipe may be beveled with an angle of about 25-35 degrees in respect to the center axis of the cable core, preferably about 30 degrees, to obtain a smooth stiffness transition between the cable and the rigid pipe.

The rigid pipes 41, 141 are secured onto the respective cable core end section 12, 112 such that axial movement of the insulation system 13 in relation to the rigid pipe is prevented, and this may e.g. be done by friction, as mentioned above. The pipes 41, 141 may be pressed onto the respective surface of the cable core end section and onto the bedding material, e.g. by crimping, in order to have minimal amount of gaps between the rigid pipe, the core and the bedding material and to create a contact pressure between the rigid pipe and the insulation system to also prevent axial displacement of the cable insulation material. The bedding material may also be first placed inside the recess before pressing the pipe onto the respective surface of the cable core end section. When the rigid pipes are pressed onto the surface of the respective cable core end section and bedding material, the bedding material, due to its elasticity, will be pressed against the surface of the cable core. The rigid pipe is preferably made of metal, e.g. steel, that can sustain high external and internal pressures. Suitably the metal has an E-module of from 70-210 GPa, but is not limited to this.

The rigid pipe suitably has an inner diameter that is wider than the outer diameter of the cable core such that the rigid pipe can be axially slipped over the cable core end section, before jointing the two cable core ends and such that the bedding material fits inside the rigid pipe. When the rigid pipe has been installed in its correct position over the cable core, a tool is used to secure the pipe onto the cable core, e.g. by pressing, in order to obtain the proper continuous contact between internal the surface of the rigid pipe and the external surface of the cable core end section and the bedding material layer.

The cable core end section and the first and second cable insulation system deformation preventing devices can be arranged immovable in the axial direction in relation to the casing assembly. This can be arranged for example by device of any suitable securing arrangement, for example by device of stop flanges, for axially locking the rigid pipe in relation to the casing assembly.

The cable entry parts may be components of the casing assembly that originally are separate parts in order to facilitate the mounting of the rigid joint assembly. The respective cable entry part is then connected to the casing body by suitable device. Usually this is done by welding in order to obtain the water tight metallic seal that is required for the entire casing assembly. As another alternative, the cable entry parts may be integral parts of the casing assembly.

The free end portion of the rigid pipe facing towards the casing assembly may be connected to an inlay (not shown) which is inserted between the rigid pipe and the casing assembly, for example the wall of the cable entry part. Such inlay is designed to fill the gap between the cable core end section, the rigid pipe and the wall of the casing assembly. The inlay may be for example an annular element or comprise two semi-annular parts, for example of metal. This end region of the rigid pipe, i.e. the end facing away from the interior of the casing assembly, may also be covered by lead soldering that ensures water tightness and a metallic fusion barrier.

The first and second cable insulation system deformation preventing devices are suitably directly mounted onto the outer semi-conducting layer of the insulation system. The bedding material is located externally of the cable insulation system and the rigid pipe of the first and second cable insulation system deformation preventing device is secured onto the bedding material. It may also be possible to mount the first and second cable insulation system deformation preventing device on an intermediate layer arranged between the insulation system and the first and second cable insulation system deformation preventing device. Such an intermediate layer protects the insulation system and may be for example a metallic layer.

It should be understood that the exact axial location of the first cable insulation system deformation preventing device 40, 140 in relation to the casing assembly 30 can be varied depending on circumstances on a case to case basis. The rigid pipe 41, 141 of the cable insulation system deformation preventing device 40, 140 should be located outside the water-tight casing assembly 30, and should preferably be located such that there is no part of the cable insulation system that is directly exposed to external pressure between the rigid pipe and the inner cable entry part of the casing assembly. FIG. 2a shows an end portion 44 of the rigid pipe 41 located closest to the casing assembly 30. The length of the end portion corresponds to about 1-15% of the length of the rigid pipe depending on the design of the rigid pipe and the water-tight casing assembly. is As shown in FIG. 2a, the end portion 44 is connected to an inner edge surface 47 of the wall section piece 35 constituting the inner cable entry part 32 of the casing assembly 30. The end portion 44 of the rigid pipe should not extend inwards of the inner edge surface 47 and thus inside the casing assembly 30. In the corresponding way an end portion 144 of the rigid pipe 141 located closest to the casing assembly 30 in the opposite end of the casing assembly should be connected to an inner edge surface 147 of the wall section piece 135 constituting the second inner cable entry part 132 of the casing assembly 30, and the rigid pipe should not extend inwards of the inner edge surface 147 and thus inside the casing assembly 30 as shown by FIG. 2b. The rigid pipe shall thus be affected by the surrounding pressure. The length of the rigid pipe 41 may vary depending on the particular circumstances in each case. A length of at least 40 mm is generally preferable, and more preferably at least 100 mm, or even at least 200 mm.

In FIGS. 2a and 2b and 3a and 3b and the part of the description above that is related to these figures, the word cable has been used and the reference numbers related to the first cable in the joint of FIG. 1 have been used. However, it should be understood that everything that has been described relating to "the cable" and using the reference numbers of the first cable are equally applicable to the second cable 110 shown in FIG. 1.

In order to obtain the final rigid joint, the described inventive rigid joint assembly is placed in an outer container (not shown) in the usual manner that has been described in the background part of this description. For submarine DC cables containing one cable core, one rigid joint assembly is placed in the outer container which is also used to connect the armour layers of the cable. For submarine AC cables containing three cable cores, three of the described inventive rigid joint assemblies are placed in one outer container which is also used to connect the armour layers of the cables.

The invention shall not be considered limited to the illustrated embodiments, but can be modified and altered in many ways, as realised by a person skilled in the art, without departing from the scope defined in the appended claims. In particular, the invention should not be limited to a certain type of cable, but should encompass any type of electric cable having one or more electric cable cores that falls within the scope of the appended claims.

The invention claimed is:

1. A rigid joint assembly comprising a first cable core end section of a first electric cable, and a second cable core end section of a second electric cable, said respective first and second cable core end section including an electrical cable core having at least an inner electric conductor and an insulation system having at least an inner semi-conducting layer, an insulation layer and an outer semi-conducting layer, said rigid joint assembly further including a joint connection inside of which the electrical cable core of the first cable core end section of the first electric cable is jointed with the electrical cable core of the second cable core end section of the second electric cable, the rigid joint assembly further including a water tight metal casing assembly surrounding the joint connection, which casing assembly includes a casing body and inner cable entry parts at opposite end of the casing assembly, wherein the rigid joint assembly further includes:

first and second outer cable entry parts located at opposite ends of the casing assembly outside the casing assembly, the outer cable entry parts including a respective opening for receiving the respective cable core end section of the first cable and second cable, first and second cable insulation system deformation preventing devices, each including a rigid pipe, which surrounds the respective first or second cable core end section at the respective outer cable entry part, and a bedding material layer which extends at least partially along a length of an inner surface of the respective rigid pipe, and first and second grooved pipes of elastic material including a plurality of grooves on the side facing the cable, each grooved pipe surrounding the respective first or second cable core end section at the respective inner cable entry part.

2. The rigid joint assembly according to claim 1, wherein each bedding material layer includes elastic synthetic polymeric material and each bedding material layer has a thickness of from 1-10 mm.

3. The rigid joint assembly according to claim 1, wherein the elastic material of each of the grooved pipes includes elastic synthetic polymeric material.

4. The rigid joint assembly according to claim 1, wherein the material of the bedding material layers and the elastic material of the grooved pipes are the same.

5. The rigid joint assembly according to claim 1, wherein each of the bedding material layers extends up to about 80% of the total length of the respective rigid pipe and is positioned such that it extends to the end of the respective rigid pipe that is closest to the casing assembly.

6. The rigid joint assembly according to claim 1, wherein at least one of the grooved pipes is surrounded radially outwards by a rigid casing.

7. The rigid joint assembly according to claim 1, wherein each of the grooved pipes is arranged at a distance from the respective rigid pipe in the axial direction of the cable.

8. The rigid joint assembly according to claim 1, wherein the bedding material layer and the respective grooved pipe are at least partly arranged in contact with each other.

9. The rigid joint assembly according to claim 1, wherein the bedding material layer and the grooved pipe in the respective side of the casing assembly are integrated.

10. The rigid joint assembly according to claim 1, wherein an end portion of the grooved pipe faced towards an end surface of the rigid pipe in the respective side of the casing assembly is tapered.

11. The rigid joint assembly according to claim 1, wherein the grooved pipe is arranged at a distance in radial direction from the inner surface of the inner cable entry part inside the casing assembly.

12. The rigid joint assembly according to claim 1, wherein the rigid pipe includes a circumferential recess adapted to contain the bedding material layer.

13. The rigid joint assembly according to claim 1, wherein the external surface of the cable core end section is the outer semi-conducting layer of the insulation system of the cable core of the respective cable core end section.

14. The rigid joint assembly according to claim 1, wherein the rigid joint assembly is surrounded by a protective sheath that extends along the whole length of the rigid joint assembly.

15. The rigid joint assembly according to claim 1, wherein the respective inner cable entry part is a separate part connectable to the casing body.

16. The rigid joint assembly according to claim 2, wherein the elastic material of each of the grooved pipes includes elastic synthetic polymeric material.

17. The rigid joint assembly according to claim 2, wherein the material of the bedding material layers and the elastic material of the grooved pipes are the same.

18. The rigid joint assembly according to claim 2, wherein each of the bedding material layers extends up to about 80% of the total length of the respective rigid pipe and is positioned such that it extends to the end of the respective rigid pipe that is closest to the casing assembly.

19. The rigid joint assembly according to claim 2, wherein at least one of the grooved pipes is surrounded radially outwards by a rigid casing.

* * * * *